(12) United States Patent
Huang et al.

(10) Patent No.: US 11,906,834 B2
(45) Date of Patent: Feb. 20, 2024

(54) TOUCH PANEL WITH DIFFERENT DENSITY OF ELECTRODES IN THE EDGE AREA AND DISPLAY DEVICE

(71) Applicant: HUIZHOU CHINA STAR OPTOELECTRONICS TECHNOLOGY CO., LTD., Guangdong (CN)

(72) Inventors: Dongchen Huang, Guangdong (CN); Chingyuan Cheng, Guangdong (CN)

(73) Assignee: HUIZHOU CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 747 days.

(21) Appl. No.: 16/962,520

(22) PCT Filed: May 20, 2020

(86) PCT No.: PCT/CN2020/091205
§ 371 (c)(1),
(2) Date: Jul. 16, 2020

(87) PCT Pub. No.: WO2021/227101
PCT Pub. Date: Nov. 18, 2021

(65) Prior Publication Data
US 2023/0111303 A1   Apr. 13, 2023

(30) Foreign Application Priority Data

May 9, 2020   (CN) .......................... 202010387077.4

(51) Int. Cl.
*G02F 1/13* (2006.01)
*G02F 1/1333* (2006.01)
(Continued)

(52) U.S. Cl.
CPC ........ *G02F 1/13338* (2013.01); *G06F 3/0412* (2013.01); *G06F 3/0445* (2019.05); *G06F 3/0446* (2019.05); *G06F 2203/04111* (2013.01)

(58) Field of Classification Search
CPC ..... G06F 3/0445; G06F 3/0446; G06F 3/0412
See application file for complete search history.

(56) References Cited

U.S. PATENT DOCUMENTS

2015/0022735 A1   1/2015   Hsu
2015/0199057 A1*  7/2015   Minami ................. G06F 3/047
                                                                    345/174
(Continued)

FOREIGN PATENT DOCUMENTS

CN   101882041 A   11/2010
CN   102419655 A    4/2012
(Continued)

*Primary Examiner* — Liliana Cerullo
(74) *Attorney, Agent, or Firm* — SOROKER AGMON NORDMAN RIBA

(57) ABSTRACT

A touch panel and a display device are disclosed. The touch panel includes a first area and a second area, and further includes: a plurality of first electrodes located in the first area and a plurality of second electrodes located in the second area. An arrangement density of the first electrodes is greater than an arrangement density of the plurality of second electrodes.

4 Claims, 4 Drawing Sheets

(51) Int. Cl.
     *G06F 3/044*     (2006.01)
     *G06F 3/041*     (2006.01)

(56) References Cited

U.S. PATENT DOCUMENTS

| | | | | |
|---|---|---|---|---|
| 2016/0364593 A1* | 12/2016 | Lee | ............... | G06F 3/0446 |
| 2018/0188884 A1 | 7/2018 | Bytheway | | |
| 2019/0034024 A1* | 1/2019 | Park | ............... | G06F 3/041661 |
| 2021/0019021 A1 | 1/2021 | Zhang | | |

FOREIGN PATENT DOCUMENTS

| | | | |
|---|---|---|---|
| CN | 102419670 | A | 4/2012 |
| CN | 102830850 | A | 12/2012 |
| CN | 103914183 | A | 7/2014 |
| CN | 104216160 | A | 12/2014 |
| CN | 204066077 | U | 12/2014 |
| CN | 107229164 | A | 10/2017 |
| CN | 110036361 | A | 7/2019 |
| JP | 2013025626 | A | 2/2013 |

* cited by examiner

TOUCH PANEL WITH DIFFERENT DENSITY OF ELECTRODES IN THE EDGE AREA AND DISPLAY DEVICE

FIELD OF INVENTION

The present application relates to the field of display technologies, more particularly, to the field of display panel manufacturing technologies, and specifically to a touch panel and a display device.

BACKGROUND OF INVENTION

Touch display technologies allow users to touch the icons or texts on touch screens with their fingers to realize the operation of computers corresponding to the touch screens, omitting the use of keyboard and mouse operations, so that the human-computer interaction is straightforward.

For a large-size touch screen, the area that is frequently touched in actual operation is mainly located on a central area of the touch screen. The touch frequency in an edge area of the touch screen is much fewer than the touch frequency in the central area of the touch screen. In other word, the touch accuracy requirement of the edge area of the screen is much lower than the touch accuracy requirement of the central area of the touch screen. However, touch channels for the edge area and touch channels for the central area in the touch screen in the prior art are arranged at the same interval, so that the density of the touch channels in the edge area where the touch frequency or the touch accuracy is low is the same as the density of the touch channels for the central area where the touch frequency or the touch accuracy is high, thereby resulting in the waste of the touch channels in the edge area, thereby increasing the unnecessary costs.

In summary, it is necessary to provide a touch panel and a display device that can improve the utilization rate of touch channels and reduce costs.

SUMMARY OF INVENTION

Technical Problems

The embodiments of the present disclosure provide a touch panel and a display device. An arrangement density of a plurality of first electrodes located in a first area is configured to be greater than an arrangement density of a plurality of second electrodes located in a second area, so as to solve the problem of low utilization rate of touch channels in an edge area of the existing touch panel, which increases unnecessary costs.

Technical Solutions

An embodiment of the present disclosure provides a touch display panel, comprising a first area and a second area, and the touch display panel further comprises:

a plurality of first electrodes, wherein the plurality of first electrodes are located in the first area, and the plurality of first electrodes are arranged in parallel; and a plurality of second electrodes, wherein the plurality of second electrodes are located in the second area, the plurality of second electrodes are arranged in parallel, an arrangement density of the plurality of first electrodes is greater than an arrangement density of the plurality of second electrodes, each of the plurality of first electrodes and each of the plurality of second electrodes have the same size, a first gap is provided between the two adjacent first electrodes of the plurality of first electrodes, a second gap is provided between the two adjacent second electrodes of the plurality of second electrodes, and a width of the first gap is smaller than a width of the second gap, wherein a width of the second gap away from the first area is larger than a width of the second gap close to the first area, a width of the first gap close to the second area is larger than a width of the first gap away from the second area, or each of the first gaps has the same width.

In an embodiment, the first area includes a central area of the touch panel, and the second area is disposed around the first area.

In an embodiment, the touch panel further comprises: a plurality of third electrodes, wherein the plurality of third electrodes are located in the first area, the plurality of third electrodes intersect with the plurality of first electrodes, and the plurality of third electrodes are insulated from the plurality of first electrodes.

In an embodiment, an arrangement density of the plurality of third electrodes is equal to the arrangement density of the plurality of first electrodes.

In an embodiment, the plurality of third electrodes and the plurality of first electrodes are disposed in the same layer, or the plurality of third electrodes and the plurality of first electrodes are disposed in different layers.

An embodiment of the present disclosure further provides a touch display panel. The touch panel comprises a first area and a second area. The touch panel further comprises:

a plurality of first electrodes, wherein the plurality of first electrodes are located in the first area; and a plurality of second electrodes, wherein the plurality of second electrodes are located in the second area, and an arrangement density of the plurality of first electrodes is greater than an arrangement density of the plurality of second electrodes.

In an embodiment, the first area includes a central area of the touch panel, and the second area is disposed around the first area.

In an embodiment, each of the plurality of first electrodes and each of the plurality of second electrodes have the same size; and the plurality of first electrodes are arranged in parallel, the plurality of second electrodes are arranged in parallel, a first gap is provided between the two adjacent first electrodes of the plurality of first electrodes, a second gap is provided between the two adjacent second electrodes of the plurality of second electrodes, and a width of the first gap is smaller than a width of the second gap.

In an embodiment, a width of the second gap away from the first area is larger than a width of the second gap close to the first area.

In an embodiment, a width of the first gap close to the second area is larger than a width of the first gap away from the second area In an embodiment, each of the second gaps has the same width.

In an embodiment, each of the first gaps has the same width.

In an embodiment, the touch panel further comprises: a plurality of third electrodes, wherein the plurality of third electrodes are located in the first area, the plurality of third electrodes intersect with the plurality of first electrodes, and the plurality of third electrodes are insulated from the plurality of first electrodes.

In an embodiment, an arrangement density of the plurality of third electrodes is equal to the arrangement density of the plurality of first electrodes.

In an embodiment, the plurality of third electrodes and the plurality of first electrodes are disposed in the same layer, or the plurality of third electrodes and the plurality of first electrodes are disposed in different layers.

An embodiment of the present disclosure further provides a display device, comprising a color filter substrate, a polarizer, a cover plate, and a touch panel;

wherein the polarizer is provided between the color filter substrate and the cover plate;

the touch panel is disposed on a side of the polarizer close to the cover plate, the touch panel is disposed between the polarizer and the color filter substrate, or the touch panel is disposed on a side of the color filter substrate away from the polarizer, the touch panel includes a first area and a second area, and the touch panel includes:

a plurality of first electrodes, wherein the plurality of first electrodes are located in the first area;

a plurality of second electrodes, wherein the plurality of second electrodes are located in the second area, and an arrangement density of the plurality of first electrodes is greater than an arrangement density of the plurality of second electrodes.

Beneficial Effect

The touch panel and the display device are provided by the embodiments of the present disclosure. The touch display panel includes a plurality of first electrodes located in the first area and the plurality of second electrodes located in a second area. Based on the touch accuracy requirements for the first area and the second area, the number of the plurality of second electrodes in the second area are reduced by, for example, rendering an arrangement density of the plurality of first electrodes greater than, an arrangement density of the plurality of second electrodes. Accordingly, the utilization rate of the second electrodes is improved, and the cost of the touch panel is reduced under the premise of meeting the touch accuracy requirements of the second area of the touch panel.

DESCRIPTION OF DRAWINGS

The technical solutions and other beneficial effects of the present disclosure will be apparent from the following detailed description of the specific embodiments of the present disclosure with reference to the attached drawings.

DETAILED DESCRIPTION OF PREFERRED EMBODIMENTS

Figure 1:
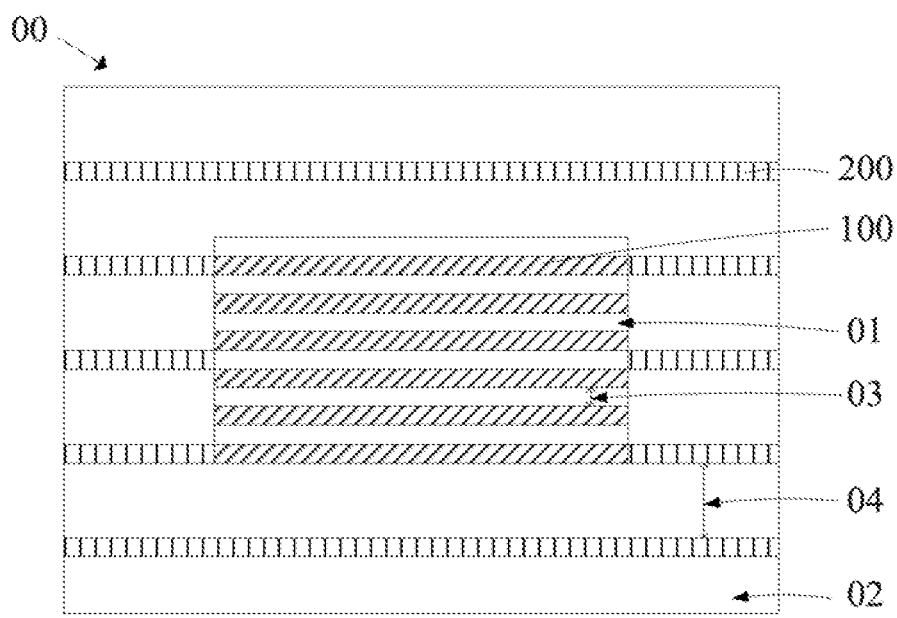
FIG. 1 is a schematic top view of a first touch panel provided by an embodiment of the present disclosure.

The technical solutions in the embodiments of the present disclosure will be described clearly and continuously with reference to the drawings in the embodiments of the present disclosure. Obviously, the described embodiments are only a part but not all of the embodiments of the present disclosure. Based on the embodiments in the present disclosure, all other embodiments obtained by those skilled in the art without making creative work fall within the protection scope of the present disclosure.

In the description of this application, it should be understood that the orientation or positional relationship indicated by the terms "away", "close", "upper", "row", "column", etc. is based on the orientation or positional relationship shown in the drawings, merely for facilitating the description of the present disclosure and simplifying the description, rather than indicating or implying that the denoted device or element must have a specific orientation, be constructed and operated in a specific orientation, and therefore cannot be understood as limitation to the present disclosure. In addition, terms such as "first" and "second" are used for purposes of description and are not intended to indicate or imply relative importance or to imply the number of indicated technical features. Thus, the feature defined with "first" and "second" may comprise one or more of the features expressly or implicitly. In the description of the present disclosure, "a plurality of" means two or more, unless otherwise specifically limited.

In the drawings, like reference numerals indicate like components. The "embodiments" mentioned herein means that particular features, structures, or characteristics described with reference to the embodiments may be included in at least one embodiment of the present disclosure. Phrases appearing at various positions of the specification neither always refer to the same embodiment, nor separate or alternative embodiments that are mutually exclusive with other embodiments. It is explicitly and implicitly understood by those skilled in the art that the embodiments described herein may be combined with other embodiments.

An embodiment of the present disclosure provides a touch panel. The touch panel includes but is not limited to the following embodiments and combinations of the following embodiments.

In an embodiment, as shown in FIGS. 1-4 and 7, the touch panel 00 includes a first area 01 and a second area 02. The touch panel 00 further includes: a plurality of first electrodes 100 located in the first area 01 and a plurality of second electrodes 200 located in the second area 02. An arrangement density of the plurality of first electrodes 100 is greater than an arrangement density of the plurality of second electrodes 200.

As shown in FIG. 1, the first area 01 includes a central area of the touch panel 00, and the second area 02 is provided around the first area 01. For example, when the first area 01 is circular or oval, the second area 02 is provided around the first area 01, or the second area 02 is provided on a partial area around the first area 01. When the first area 01 is square, the second area 02 is provided around the second area 02, or the second area 02 is provided on one side of the second area 02. In FIG. 1, only the first area 01 in square and the second area 02 disposed around the second area 02 are taken as example for illustration. It should be noted that the central area can be understood as an area with a certain size located on the central position of the touch panel 00, which is intended to emphasize that the first area 01 is closer to the central position of the touch panel 00 relative to the second area 02, or to emphasize that the second area 02 is closer to the edge position of the touch panel 00 relative to the first area 01.

It can be understood that since the touch accuracy requirement of the second area 02 is less than the touch accuracy requirement of the first area 01, the arrangement density of the plurality of second electrodes 200 in the second area 02 may be less than the arrangement density of the plurality of first electrodes 100 in the first area 01. The arrangement density of the plurality of second electrodes 200 is reasonably reduced as long as the touch accuracy requirements of the second area 02 are met, so as to improve the utilization rate of the plurality of second electrodes 200 of the second area 02 and decrease the costs.

In an embodiment, as shown in FIG. 1, each of the plurality of first electrodes 100 and each of the plurality of second electrodes 200 have the same size. The plurality of first electrodes 100 are arranged in parallel, and the plurality of second electrodes are arranged in parallel. A first gap 03 is provided between the two adjacent first electrodes 100 of the plurality of first electrodes 100, and a second gap 04 is provided between the two adjacent second electrodes 200 of the plurality of second electrodes 200. A width of the first gap 03 is smaller than a width of the second gap 04.

It can be understood that when each of the plurality of first electrodes 100 and each of the plurality of second electrodes 200 have the same size, by the configuration of the width of the first gap 03 to be smaller than the width of the second gap 04, i.e., the plurality of second electrodes 200 being relatively sparsely arranged relative to the plurality of first electrodes 100, the number of the plurality of second electrodes 200 in the second area 02 can be appropriately reduced. Under the condition that the touch accuracy requirement of the second area 02 is met, the number of the plurality of second electrodes 200 is reduced. Alternatively, when the width of the first gap 03 is smaller than the width of the second gap 04, the sizes of the plurality of second electrodes 200 may be slightly larger than the sizes of the plurality of first electrodes 100, so as to ensure the achievement of the touch accuracy requirement of the second area 02.

An arrangement direction of the plurality of first electrodes 100 and an arrangement direction of the plurality of second electrodes 200 may be the same or different. For example, when the arrangement direction of the plurality of first electrodes 100 and the arrangement direction of the plurality of second electrodes 200 are the same, the plurality of first electrodes 100 and the plurality of second electrodes 200 may transmit row touch signals or column touch signals. When the arrangement direction of the plurality of first electrodes 100 is different from the arrangement direction of the plurality of second electrodes 200, the plurality of first electrodes 100 and the plurality of second electrodes 200 may respectively transmit row touch signals and column touch signals.

Figure 2:
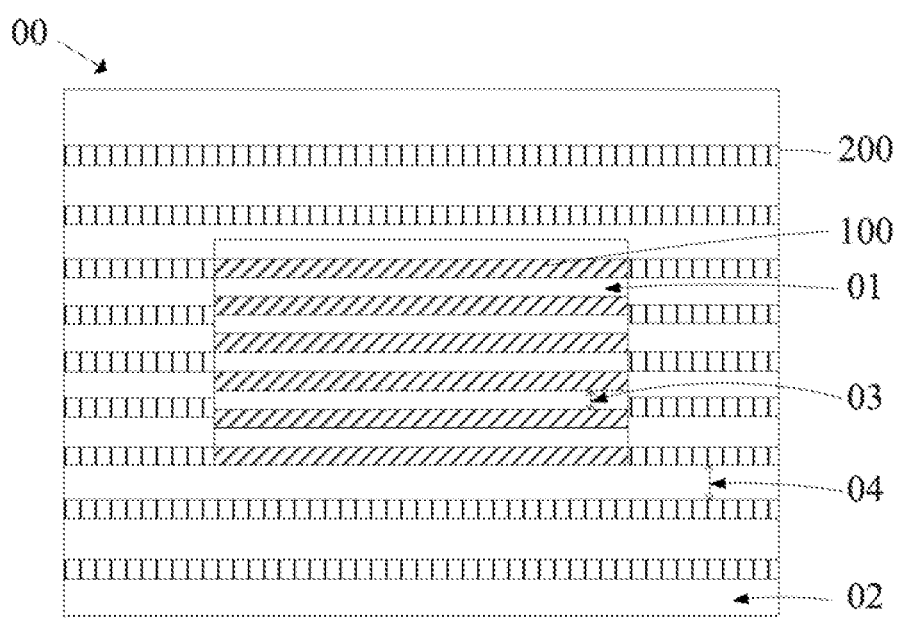
FIG. 2 is a schematic top view of a second touch panel provided by an embodiment of the present disclosure.

In an embodiment, as shown in FIG. 2, the width of the second gap 04 away from the first area 01 is greater than the width of the second gap 04 close to the first area 01. It can be understood that, since the touch accuracy requirement of the second area 02 is smaller than the touch accuracy requirement of the first area 01, and further, there is a negative correlation between the touch accuracy requirements of the different positions in the second area 02 and a distance between the position and the first area 01. That is, the farther the position in the second area 02 is away from the first area 01, the lower the touch accuracy requirement is. The farther the position is away from the first area 01, the greater the width of the second gap 04 is. That is, the number of the plurality of second electrodes 200 can be appropriately reduced by appropriately increasing the width of the second gap 04 away from the first area 01.

Figure 3:
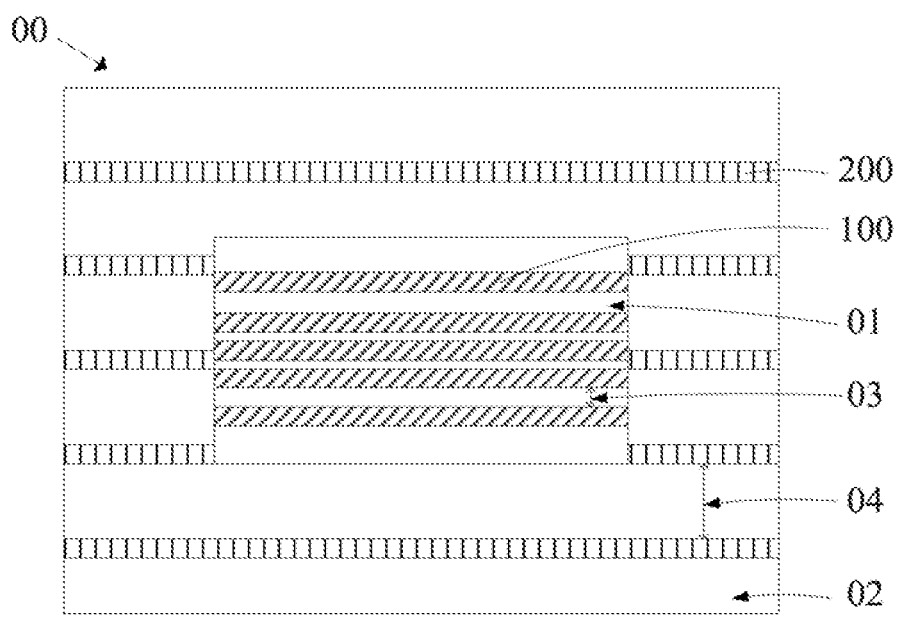
FIG. 3 is a schematic top view of a third touch panel provided by an embodiment of the present disclosure.

In an embodiment, as shown in FIG. 3, the width of the first gap 03 close to the second area 02 is greater than the width of the first gap 03 away from the second area 02. It can be understood that, since the touch accuracy requirement of the second area 02 is smaller than the touch accuracy requirement of the first area 01, and further, there is a positive correlation between the touch accuracy requirements of the different positions in the first area 01 and a distance between the position and the second area 02. That is, the closer the position in the first area 01 is to the second area 02, the lower the touch accuracy requirement is. The closer the position is to the second area 02, the greater the width of the first gap 04 is. That is, the number of the plurality of first electrodes 100 can be appropriately reduced by appropriately increasing the width of the first gap 03 close to the second area 02.

In an embodiment, as shown in FIG. 1, each of the second gaps 04 has the same width. It can be understood that on the premise that the arrangement density of the plurality of first electrodes 100 is greater than the arrangement density of the plurality of second electrodes 200, the touch accuracy at any position in the second area 02 may be equal by the configuration of the same width of each of the second gaps 04 in the second area 02, i.e., the plurality of second electrodes 200 being arranged at equal intervals, thereby improving the uniformity of the touch accuracy in the second area 02.

Further, for the same reason, in order to improve the uniformity of the touch accuracy in the first area 01, a width of each of the first gaps 03 in the first area 01 may be configured to be the same. That is, the plurality of first electrodes 100 are arranged at equal intervals, so that the touch accuracy at any position in the first area 01 is equal, so as to improve the uniformity of the touch accuracy in the first area 01.

Figure 4:
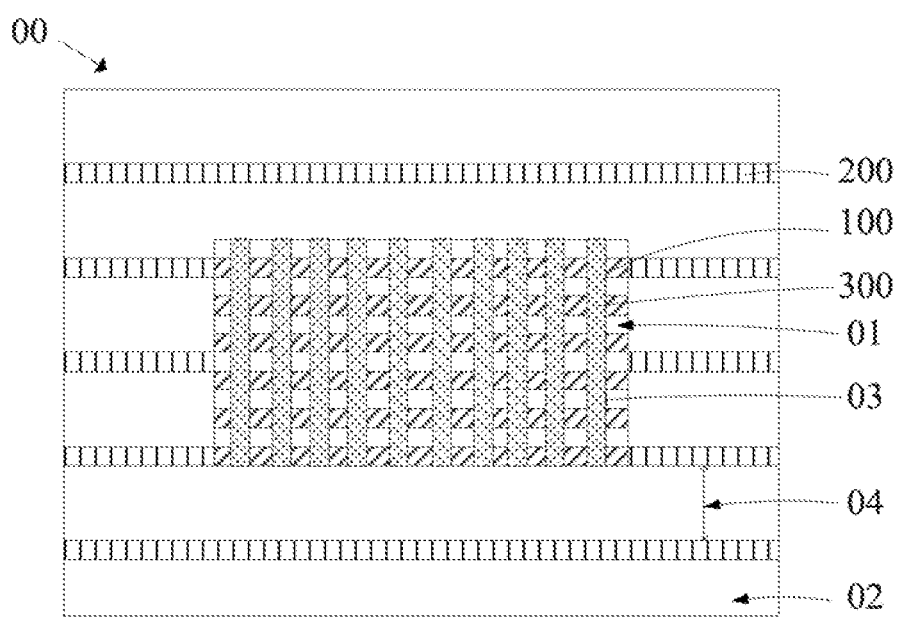
FIG. 4 is a schematic top view of a fourth touch panel provided by an embodiment of the present disclosure.

In an embodiment, as shown in FIG. 4, the touch panel 00 further includes a plurality of third electrodes 300 located in the first area 01. The plurality of third electrodes 300 intersect the plurality of first electrodes 100, and the plurality of third electrodes 300 and the plurality of first electrodes 100 are insulated from each other.

It can be understood that the intersection position of each third electrode 300 and each first electrode 100 can form the capacitor. When pressing any intersection position causes the corresponding capacitance value to change the touch panel 00 can Identify the coordinate of the point to response.

An insulating block may be provided at an intersection position of the plurality of third electrodes 300 and the plurality of first electrodes 100, and the insulation block is provided between the corresponding third electrode 300 and the corresponding first electrode 100, so as to prevent electrical connection between the plurality of third electrodes 300 and the plurality of first electrodes 100, and a short circuit caused by the contact of the third electrodes 300 and the first electrodes 100 at the intersection position when the touch panel 00 is pressed. Material of the insulating block includes at least one of silicon nitride and silicon oxynitride. Further, one side of the insulating block close to the third electrode 300 and one side of the insulating block close to the first electrode 100 are respectively provided with an interface layer, and material of the interface layer includes silicon oxide or amorphous silicon. The interface layer can improve the adhesion between the insulating block and the first electrode 100, and between the insulating block and the second electrode 200.

Figure 5:
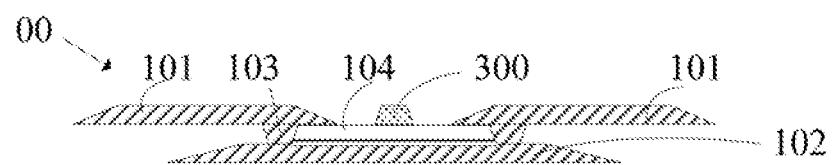
FIG. 5 is a schematic cross-sectional view of a touch panel provided by an embodiment of the present disclosure.

In an embodiment, as shown in FIG. 5, the plurality of third electrodes 300 and the plurality of first electrodes 100 are disposed in the same layer. Specifically, the first electrode 100 includes at least two first electrode portions 101, the two first electrode portions 101 and the third electrode 300 are provided in the same layer, and the two first electrode portions 101 are provided on left and right sides of the third electrode 300. The first electrode 100 further includes a bridge portion provided on one side of the third electrode 300, and the bridge portion includes a bridge body 102 and two bridge ends 103. The bridge body 102 is disposed between the two first electrode portions 101, the two bridge ends 103 are respectively disposed on both sides of the bridge body 102, and the two bridge ends 103 are respectively connected to the bridge body 102 and the two first electrode portions 2011. Further, an insulating block 104 may be provided between the third electrode 300 and the corresponding bridge portion to insulate the third electrode 300 from the corresponding bridge portion.

Figure 6:
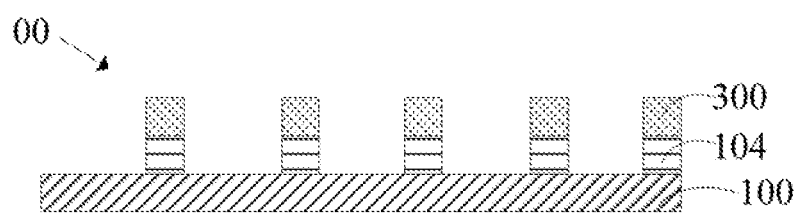
FIG. 6 is a schematic cross-sectional view of another touch panel provided by an embodiment of the present disclosure.

In an embodiment, as shown in FIG. 6, the plurality of third electrodes 300 and the plurality of first electrodes 100 are disposed in different layers. Specifically, a film layer formed by the plurality of third electrodes 300 may be located above a film layer formed by the plurality of first electrodes 100. That is, all of the plurality of third electrodes 300 are located on the same side of the plurality of first electrodes 100. Further, an insulating block 104 may be provided between the third electrode 300 and the corresponding bridge portion to insulate the third electrode 300 and the corresponding first electrode 100. The insulating block 104 may be disposed opposite to the third electrode 300, or the insulating block 104 may form a complete film layer between the plurality of third electrodes 300 and the plurality of first electrodes 100, so that the alignment requirement of the third electrode 300 and the insulating block 104 is omitted, and the accuracy requirement is reduced.

In an embodiment, as shown in FIG. 4, an arrangement density of the plurality of third electrodes 300 is equal to the arrangement density of the plurality of first electrodes 100. It can be understood that, since the plurality of third electrodes 300 and the plurality of first electrodes 100 are respectively arranged in different directions, when the arrangement density of the plurality of third electrodes 300 and the arrangement density of the plurality of first electrodes 100 are equal, the touch accuracy in the different directions may be equal, so that the intersection positions of the plurality of third electrodes 300 and the plurality of first electrodes 100 are evenly distributed, thereby improving the uniformity of touch accuracy in the first area 01.

Figure 7:
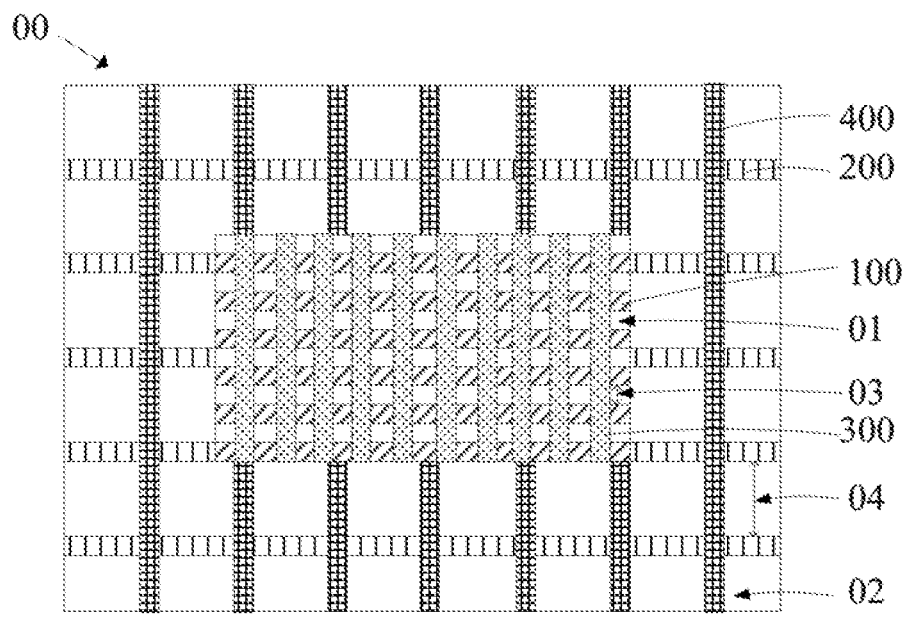
FIG. 7 is a schematic top view of a fifth touch panel provided by an embodiment of the present disclosure.

In an embodiment, as shown in FIG. 7, the touch panel 00 further includes a plurality of fourth electrodes 400 located in the second area 02. The plurality of fourth electrodes 400 intersect the plurality of second electrodes 200, and the plurality of fourth electrodes 400 and the plurality of second electrodes 200 are insulated from each other.

An insulating block may be provided at an intersection position of the plurality of fourth electrodes 400 and the plurality of second electrodes 200, and the insulation block is provided between the corresponding third electrode 300 and the corresponding second electrode 200, so as to prevent electrical connection between the plurality of fourth electrodes 400 and the plurality of second electrodes 200, and a short circuit caused by the contact of the fourth electrode 400 and the second electrode 200 at the intersection position when the touch panel 00 is pressed. Material of the insulating block includes at least one of silicon nitride and silicon oxynitride.

The plurality of fourth electrodes 400 and the plurality of second electrodes 200 are disposed in the same layer, or the plurality of fourth electrodes 400 and the plurality of second electrodes 200 are disposed in different layers.

An arrangement density of the plurality of fourth electrodes 400 is equal to the arrangement density of the plurality of second electrodes 200.

Specifically, for the arrangement method of the plurality of fourth electrodes 400, refer to the arrangement method of the plurality of third electrodes 300, and for the mutual arrangement relationship between the fourth electrodes 400 and the second electrodes 200, refer to the mutual arrangement relationship between the third electrodes 300 and the first electrodes 100.

Figure 8:
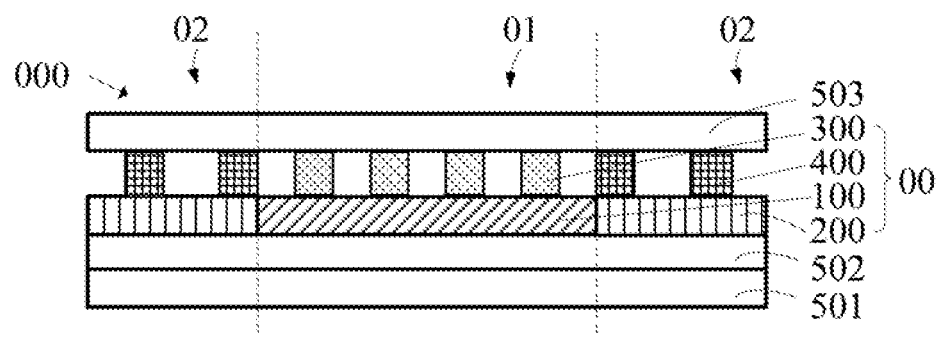
FIG. 8 is a schematic cross-sectional view of a display device provided by an embodiment of the present disclosure.

An embodiment of the present disclosure provides a display device. As shown in FIG. 8, the display device 000 includes a color filter substrate 501, a polarizer 502, a cover plate 503, and a touch panel 00. The polarizer 502 is disposed on the color filter substrate 501 and the cover plate 503. The touch panel 00 is provided on a side of the polarizer 502 close to the cover plate 503, between the polarizer 502 and the color filter substrates 501, or on a side of the color filter substrate 501 away from the polarizer 502.

Specifically, as shown in FIG. 8, disposing the touch panel 00 on a side of the polarizer 502 close to the cover plate 503 to form an add-on display device 000 is taken as an example for description. The touch panel 00 includes a first area 01 and a second area 02. The touch panel 100 includes a plurality of first electrodes 100 located in the first area 01, and a plurality of second electrode 200 located in the second area 02, and an arrangement density of the plurality of first electrodes 100 is greater than an arrangement density of the plurality of second electrodes 200.

As shown in FIG. 8, the touch panel 00 further includes a plurality of third electrodes 300 located in the first area 01. The plurality of third electrodes 300 intersect with the plurality of first electrodes 100, and the plurality of third electrodes 300 and the plurality of first electrodes 100 are insulated from each other. The touch panel 00 further includes a plurality of fourth electrodes 400 located in the second area 02. The plurality of fourth electrodes 400 intersect the plurality of second electrodes 200, and the plurality of fourth electrodes 400 and the plurality of second electrodes 200 are insulated from each other.

Specifically, for the method of the arrangement of the touch panel 00 in the display device 000, refer to the relevant description about the touch panel 00 above.

The touch panel and the display device are provided by the embodiments of the present disclosure. The touch display panel includes a plurality of first electrodes located in the first area and the plurality of second electrodes located in a second area. Based on the touch accuracy requirements for the first area and the second area, the number of the plurality of second electrodes in the second area are reduced by, for example, rendering an arrangement density of the plurality of first electrodes greater than an arrangement density of the plurality of second electrodes. Accordingly, the utilization rate of the second electrodes is improved and the cost of the touch panel is reduced without affecting the accuracy of the touch panel.

The touch panel and the display device provided by the embodiments of the present disclosure have been described in detail above. Specific examples are used herein for illustrating the principles and implementation of the present disclosure. The descriptions of the above embodiments are merely used to help understand the technical solutions and the core ideas of the present disclosure. It should be understood by those ordinary skilled in the art that various modifications and equivalent replacements of a part of technical features of the technical solutions of the above-mentioned embodiments can be made, without departing from the scope of the technical solutions of the embodiments of the present disclosure.

What is claimed is:

1. A touch panel, wherein the touch panel comprises a first area including a central area of the touch panel and a second area surrounding the first area, and further comprises touch electrodes for touch detection, and the touch electrodes comprises:

a plurality of first electrodes, wherein the plurality of first electrodes are located in the first area, and the plurality of first electrodes are arranged in parallel; and a plurality of second electrodes, wherein the plurality of second electrodes are located in the second area, the plurality of second electrodes are arranged in parallel, an arrangement density of the plurality of first electrodes is greater than an arrangement density of the plurality of second electrodes, each of the plurality of first electrodes and each of the plurality of second electrodes have the same size, a first gap is provided between the two adjacent first electrodes of the plurality of first electrodes, a second gap is provided between the two adjacent second electrodes of the plurality of second electrodes, and a width of the first gap is smaller than a width of the second gap, wherein a width of the second gap away from the first area is larger than a width of the second gap close to the first area, a width of the first gap close to the second area is larger than a width of the first gap away from the second area, or each of the first gaps has the same width, wherein the touch electrodes further comprises a plurality of third electrodes, the plurality of third electrodes are located in the first area, the plurality of third electrodes intersect with the plurality of first electrodes, and the plurality of third electrodes are insulated from the plurality of first electrodes, and wherein an arrangement density of the plurality of third electrodes is equal to the arrangement density of the plurality of first electrodes.

2. The touch panel of claim 1, wherein the plurality of third electrodes and the plurality of first electrodes are disposed in the same layer, or the plurality of third electrodes and the plurality of first electrodes are disposed in different layers.

3. The touch panel of claim 1, wherein each of the second gaps has the same width.

4. A display device, wherein the display device comprises a color filter substrate, a polarizer, a cover plate, and a touch panel;

wherein the polarizer is provided between the color filter substrate and the cover plate; and the touch panel is disposed on a side of the polarizer close to the cover plate, the touch panel is disposed between the polarizer and the color filter substrate, or the touch panel is disposed on a side of the color filter substrate away from the polarizer, wherein the touch panel includes a first area including a central area of the touch panel and a second area surrounding the first area, and the touch panel further includes touch electrodes for touch detection, and the touch electrodes comprises:

a plurality of first electrodes, wherein the plurality of first electrodes are located in the first area, and the plurality of first electrodes are arranged in parallel; and a plurality of second electrodes, wherein the plurality of second electrodes are located in the second area, the plurality of second electrodes are arranged in parallel, an arrangement density of the plurality of first electrodes is greater than an arrangement density of the plurality of second electrodes, each of the plurality of first electrodes and each of the plurality of second electrodes have the same size, a first gap is provided between the two adjacent first electrodes of the plurality of first electrodes, a second gap is provided between the two adjacent second electrodes of the plurality of second electrodes, and a width of the first ap is smaller than a width of the second gap, wherein a width of the second gap away from the first area is larger than a width of the second gap close to the first area, a width of the first gap close to the second area is larger than a width of the first gap away from the second area, or each of the first gaps has the same width, wherein the touch electrodes further comprises a plurality of third electrodes, the plurality of third electrodes are located in the first area, the plurality of third electrodes intersect with the plurality of first electrodes, and the plurality of third electrodes are insulated from the plurality of first electrodes, and wherein an arrangement density of the plurality of third electrodes is equal to the arrangement density of the plurality of first electrodes.

* * * * *